(12) United States Patent
Levine et al.

(10) Patent No.: US 12,260,351 B2
(45) Date of Patent: Mar. 25, 2025

(54) METHOD AND SYSTEM FOR PREDICTING THE PROBABILITY OF REGULATORY COMPLIANCE APPROVAL

(71) Applicant: Xerox Corporation, Norwalk, CT (US)

(72) Inventors: Jonathan Levine, Rochester, NY (US); Ray Uri Merriam, Rochester, NY (US); Stephen Kyle Korndoerfer, West Henrietta, NY (US); Larry Glass, Pittsford, NY (US); Michael Wiseman, Webster, NY (US); Vijayakrishna Nama, Webster, NY (US); Joseph Martin St. Germaine, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1166 days.

(21) Appl. No.: 16/179,051

(22) Filed: Nov. 2, 2018

(65) Prior Publication Data
US 2020/0143277 A1    May 7, 2020

(51) Int. Cl.
*G06N 7/01*    (2023.01)
*G06Q 10/08*    (2024.01)

(52) U.S. Cl.
CPC .............. *G06N 7/01* (2023.01); *G06Q 10/08* (2013.01)

(58) Field of Classification Search
CPC ................................ G06N 7/005; G06Q 10/08
See application file for complete search history.

(56) References Cited

U.S. PATENT DOCUMENTS

| 8,818,837 | B2 | 8/2014 | McCalmont et al. |
| 9,292,623 | B2 | 3/2016 | Walker |
| 2002/0116620 | A1 | 8/2002 | Gimbert et al. |
| 2004/0193634 | A1* | 9/2004 | Goodlett ............... G06Q 10/06 707/999.102 |

(Continued)

OTHER PUBLICATIONS

DiMasi, et al. "A tool for predicting regulatory approval after phase II testing of new oncology compounds." Clinical Pharmacology & Therapeutics 98.5 (Year: 2015).*

(Continued)

*Primary Examiner* — Michael J Huntley
*Assistant Examiner* — Adam C Standke
(74) *Attorney, Agent, or Firm* — Ortiz & Lopez, PLLC; Luis M. Ortiz; Kermit D. Lopez

(57) ABSTRACT

Methods and systems for automatically predicting the probability of regulatory compliance approval based on data contained in a data structure. A data structure can be configured to include data collated and collected from one or more regulators (e.g., regulatory agencies) and one or more value chain participants. Such data is inclusive of data indicative of actual approval-request results of applications for regulatory approval by one or more regulators and variable weights assigned to different data elements. A prediction can be then made as to the probability that an application for regulatory approval by a value chain participant will be approved by a regulator based on the data collated and collected and contained in the data structure. This approach predicts the probability that an application for regulatory approval by a value chain participant will be approved and also predicts what is missing for a regulatory approval application.

14 Claims, 8 Drawing Sheets

(56) References Cited

U.S. PATENT DOCUMENTS

| | | | |
|---|---|---|---|
| 2005/0256735 A1* | 11/2005 | Bayne | G06Q 10/0639 |
| | | | 705/7.11 |
| 2009/0089195 A1 | 4/2009 | Salomon et al. | |
| 2010/0153151 A1 | 6/2010 | Toenjes | |
| 2012/0173443 A1 | 7/2012 | Gerashchenko et al. | |
| 2013/0198094 A1* | 8/2013 | Arazy | G06Q 50/18 |
| | | | 705/317 |
| 2014/0222655 A1 | 8/2014 | Cummings | |
| 2016/0104083 A1 | 4/2016 | DeRoo et al. | |
| 2016/0132896 A1 | 5/2016 | Guerin et al. | |
| 2017/0270622 A1 | 9/2017 | Rooney | |
| 2018/0053128 A1* | 2/2018 | Costas | G06Q 50/18 |
| 2018/0178453 A1 | 6/2018 | Levine et al. | |
| 2018/0189699 A1 | 6/2018 | Lecourt et al. | |
| 2018/0225630 A1 | 8/2018 | Creager et al. | |
| 2018/0300793 A1* | 10/2018 | Chen | G06Q 30/0631 |
| 2018/0315141 A1* | 11/2018 | Hunn | G06F 9/547 |
| 2019/0026675 A1* | 1/2019 | McKibbin | G06Q 10/06393 |
| 2019/0251492 A1* | 8/2019 | Bender | G06N 3/042 |

OTHER PUBLICATIONS

Di Masi, "A tool for predicting regulatory approval after phase II testing of new oncology compounds." Clinical Pharmacology & Therapeutics 98.5 (Year: 2015).*

Debnath, M. (Sep. 2, 2016). Understanding java objects and java classes. Developer.com.https://www.developer.com/design/understanding-java-objects-and-java-classes/ (Year: 2016).*

HP Exstream 7.0, Fact Sheet, 2010 Hewlett-Packard Development Company, L.P.

OpenText™ Exstream 9.5, 2016 Open Text.

OpenText™ Exstream Delivery Manager, 2016 Open Text.

* cited by examiner

METHOD AND SYSTEM FOR PREDICTING THE PROBABILITY OF REGULATORY COMPLIANCE APPROVAL

TECHNICAL FIELD

Embodiments are generally related to the field of regulatory compliance approval and prediction. Embodiments further relate to data processing methods and systems used in regulatory compliance approval and prediction.

BACKGROUND

Conventional approaches to regulating value chain entities in a value chain (e.g., a manufacturing value chain) have involved simply filling out forms and waiting for regulatory approval. This approach, however, is rapidly changing. For example, as restricted chemicals continue to leak into the environment, governments worldwide are formulating new regulations. These new regulations will require every establishment that creates, tests, uses, and disposes of products (or part of products) containing restricted chemicals to report. This changes the conceptually simple process of filling out forms into a very complex, data analytics problem. Regulatory compliance is thus increasingly becoming a challenge.

Companies and organizations that do not comply with various new and changing national requirements will be unable to sell their products in those countries. Such new regulations, intent as they are on solving important public problems, can also cause problems for businesses and, ironically, for the regulators themselves.

Every nation has its own regulatory bodies. Within a nation, states, provinces and regions may build on the national regulations. Within a state or province, municipalities may build their own regulations on the state or provincial regulations. Furthermore, regulatory agencies are typically structured with different staff personnel deciding whether requests for regulatory approval will be granted.

It is important to note that the probability that a particular submission will be approved varies not only due to differences in legal restrictions. Such a probability can also varies due to the culture found in each regulatory office and the psychology of each individual decision-maker. When a company submits a request for approval to a regulator such as a regulatory agency (e.g., to include a regulated chemical in its manufacturing process), it may be difficult for the company to predict how each request will turn out. For example, for submissions to agencies with the same requirements, one agency may approve the request while the other may deny the request.

Regulatory compliance can be costly for companies. The inability to predict the outcome of a request for regulatory approval adds costly variations to a company's financial planning and to its sales strategy. For many companies, the costs of regulatory compliance can prevent such companies from thriving and can even drive them out of business.

Efforts have been made to solve these problems or at least reduce their effects. Such conventional efforts to date, however, have not offered the ability to predict the probability that a particular regulator will approve an application/submission for regulatory approval by a value chain participant. These conventional approaches also do not offer the ability to predict what may be missing for a regulatory approval application and also may not improve the prediction accuracy over time.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved regulatory compliance approval and prediction method and system.

It is another aspect to provide for processing methods and systems used in regulatory compliance approval and prediction.

It is another aspect of the disclosed embodiments to provide for methods and systems for automatically predicting whether a particular regulatory agency will approve a request for a particular type of regulatory application or submission for a particular manufacturer, vendor or other participant in a value chain.

It is a further aspect of the disclosed embodiments to provide for methods and systems for automatically predicting whether a particular regulatory body's approval of a particular vendor's compliance approval request will include information about the type of materials (e.g., chemicals) included in the manufacturing process.

It is still another aspect of the disclosed embodiments to provide for the improvement of prediction accuracy over time.

The aforementioned aspects and other objectives and advantages can now be achieved as described herein. Methods and systems are disclosed for automatically predicting the probability of regulatory compliance approval based on data contained in a data structure. In an example embodiment, such a data structure can be configured to include data collated and collected from one or more value chain participant submissions/applications and one or more regulators (e.g., regulatory agencies). Such data is inclusive of data indicative of actual approval-request results of applications for regulatory approval by one or more regulators and can further include variable weights assigned to varying elements associated with the data. A prediction can be made as to the probability that an application by a value chain participant for regulatory approval will be approved by a particular regular, based on the data collated and collected and contained in the data structure.

In some example embodiments, potential items that may be missing in the application that are potentially needed by the regulator(s) the regulatory approval of the application can also be predicted. In addition, a summary of such potentially missing items can also be provided.

In other example embodiments, the accuracy of the aforementioned predictions can be improved by analyzing the prediction results over a period of time.

The disclosed embodiments therefore provide for methods and systems that predict whether a particular regulatory agency will approve a request for a particular type of submission for a particular manufacturer or vendor in a value chain. A Regulatory Compliance Approval Prediction (RCAP) system/module improves its predictive accuracy over time. Each value-chain or supply-chain participant (e.g., a vendor, a manufacturer, a tester, etc.) can use the RCAP system/module to develop more accurate plans for product manufacturing, launch, and/or delivery. In addition, the disclosed RCAP system/module allows each participant to more accurately determine any missing information that each individual regulatory agency will want.

In short, the disclosed RCAP system/module acts as an intelligent assistant to help companies and organizations improve the probability that their regulatory compliance submissions will be approved as quickly as possible by each target regulatory agency.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
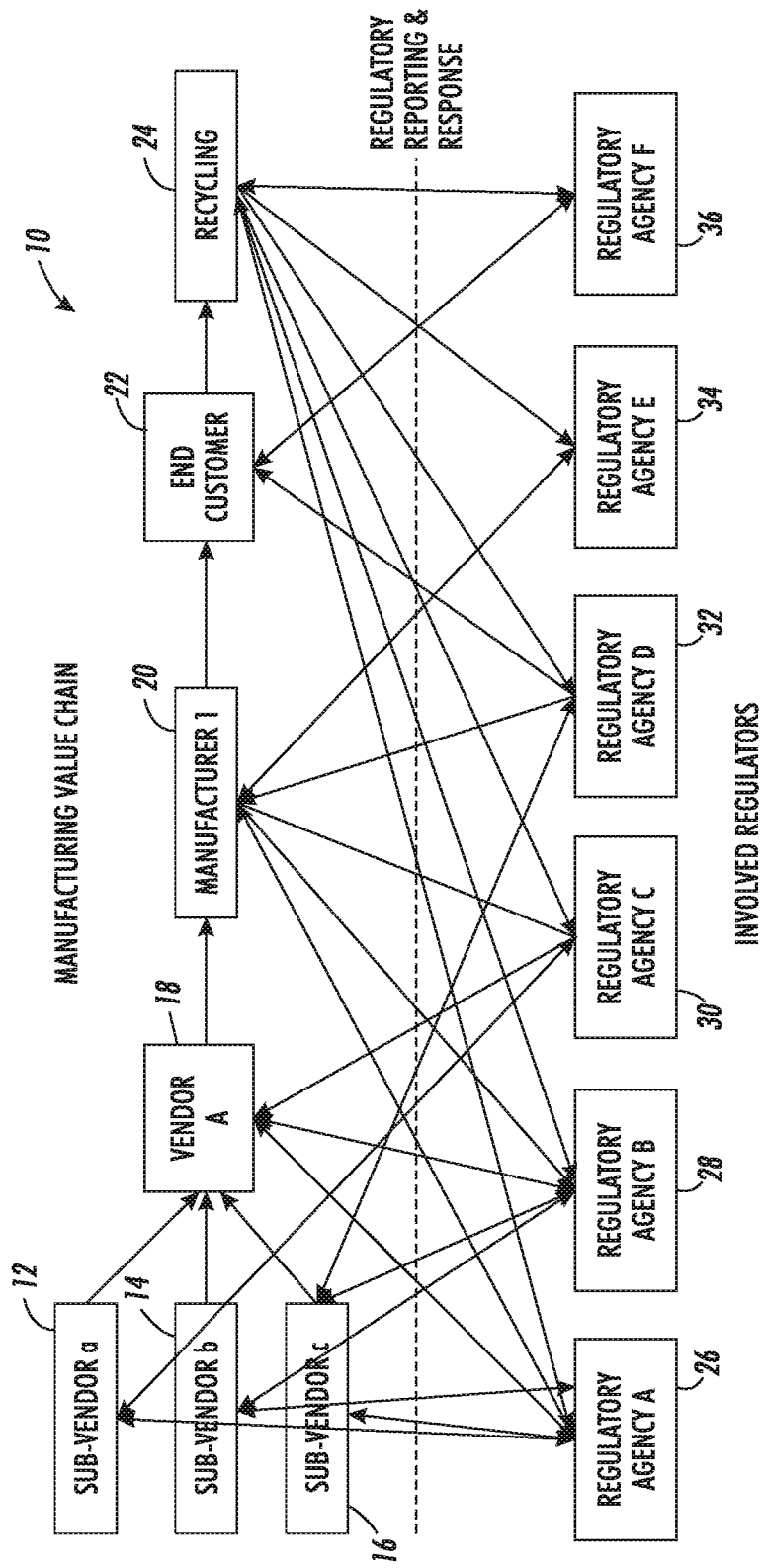
FIG. 1 illustrates a block diagram that demonstrates the complexity of the current regulatory environment without implementation of the disclosed system/method for regulatory compliance.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Several aspects of data-processing systems will now be presented with reference to various systems and methods. These systems and methods will be described in the following detailed description and illustrated in the accompanying drawings by various blocks, modules, components, circuits, steps, processes, algorithms, engines, applications etc. (which can be individually or collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include read-only memory (ROM) or random-access memory (RAM), electrically erasable programmable ROM (EEPROM), including ROM implemented using a compact disc (CD) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

The disclosed embodiments are directed to methods and systems for predicting whether a particular regulatory agency will approve a request for a particular type of submission for a particular manufacturer or vendor in a value chain. An RCAP (Regulatory Compliance Approval Prediction) system or module is disclosed, which improves its predictive accuracy over time.

As will be discussed in more detail herein, each value-chain or supply-chain participant (a vendor, a manufacturer, a tester, etc.) can use the RCAP system/module to develop more accurate plans for product manufacturing, launch, and/or delivery. In addition, the RCAP system/module helps each participant more accurately determine any missing information that each individual regulatory agency will want. The disclosed RCAP system/module therefore acts as an intelligent assistant to help companies improve the probability that their regulatory compliance submissions will be approved as quickly as possible by each target regulatory agency.

FIG. 1 illustrates a block diagram of an example system 10 for regulatory compliance. The block diagram of system 10 shown in FIG. 1 is provided to demonstrate the complexity of the current environment without the disclosed systems/methods of regulatory compliance. The subsequent figures (FIGS. 2, 3, etc) herein illustrate the much simpler, more efficient and more coherent implementation of the disclosed embodiments.

The system 10 depicted in FIG. 1 indicates the complexity in the new regulatory environment and the difficulties involved in regulatory reporting, response and approval with respect to vendors, manufactures, end customers and so on in a manufacturing value chain, and various involved regulators (e.g., government regulating agencies, etc) such as regulators 26, 28, 30, 32, 34, and 36. For example, various sub-vendors 12, 14, and 16 may require regulatory approval from one or more of the regulators 26, 28, 30, 32, 34, and 36 prior to providing a product or service to a vendor 18.

The vendor 18 may also require approval from one or more of the regulators 26, 28, 30, 32, 34, and 36 prior to providing a product a service to manufacturer 20. The manufacturer 20 in turn may also require approval from one or more of the regulators 26, 28, 30, 32, 34, and 36 prior to providing a product a service to an end customer 22. The end customer 22 may also require approval from one or more of the regulators 26, 28, 30, 32, 34, and 36 prior to providing a product a service to a recycler 24, and so on.

A complex regulatory environment such as that shown in FIG. 1 has a number of problems, which are discussed below with respect to various examples and scenarios.

Problem 1: Regulatory Compliance Reporting Exposes Intellectual Property and Private Data. When a company makes a product, the company considers the recipe of chemicals a secret competitive advantage. In some cases, to protect its interests, the company may not even want to be identified or may not want anyone to know it has contributed as a vendor in a value chain. But under new (example) regulations, when a company includes a restricted chemical in its product, the company also has to expose itself and its recipe to regulators. The regulators, or in some cases, other members of the value chain may need to contact the company, for example in the case of a violation.

Problem 2: A Naturally Complex Problem Leads to the Development of a Complex System that cannot be Maintained. A complex problem (such as new chemical compliance regulations) often leads to the development of complex systems and eventually to a bloated system this is impossible to understand. The result of this well-known problem is exemplified by Mel Conway's famous dictum: The big lesson is that complexity is toxic, leading to design errors and system disintegration. FIG. 1 thus illustrates a schematic of the kind of complexity that makes systems impossible to maintain and ultimately causes them to fail.

Problem 3: Regulatory Complexity Results in System Complexity, which in turn Inhibits Ease-of-Use and Human Understanding. A complex problem (such as new chemical compliance regulations) often leads to the development of complex systems. User interface technology is often used to hide a system's complexity. But with large, difficult problems, system complexity leaks into the user interface.

One technique for encouraging people to use a system is to make the system very easy to use. But the complexity of a system will tend, instead, to make the system very difficult to use. And this will lead people to attempt to bypass the regulatory system, to complain about the system publically, or to engage in other disruptive or even illegal behaviors that they wouldn't normally employ. Each person involved must be able to decipher the complex web and each person's understanding must be the same as everyone else's. This leads to errors and misunderstandings, adding cost and lost opportunity to the participant's business processes. FIG. 1 thus demonstrates the complexity that inhibits ease-of-use and human understanding.

Problem 4: Regulatory Complexity Inhibits Regulatory Compliance. New regulations may make it difficult for companies to comply. Such new regulations may force companies to hire experts and to invest more time and money on compliance, thereby distracting from their actual business. Small companies, for example, may not possess the money or expertise to set up mechanisms to properly report against the new regulations. Large companies may not want to make the necessary investment in time, money and expertise. These inhibitors make it less likely that companies will be able to correctly comply in the new regulatory environment.

Problem 5: Replacing Value Chain Participants is Inherently Complex. As shown in FIG. 1, the data flow for modern regulatory compliance is not linear. Instead, the data flow is more like a web of information. One element of new regulations may require that when a vendor is replaced (e.g. because the vendor did not meet its contractual agreements with its customer), its contribution to particular products must still be available and tracked in the individual products it contributed to. Similarly, its product-contribution must be distinguished from the contribution of the replacement vendor. In a linear system this is relatively straightforward. But in a web of information it becomes difficult to determine, for each regulator, which vendor has contributed to which product.

Problem 6: The New Regulatory Complexity Causes Problems for the Regulators. An interesting side effect of new regulations is that regulators themselves may not be prepared to make use of, or even handle the amount and kinds of data they will receive. It is possible that many regulators may be unable to respond to submissions.

Figure 2:
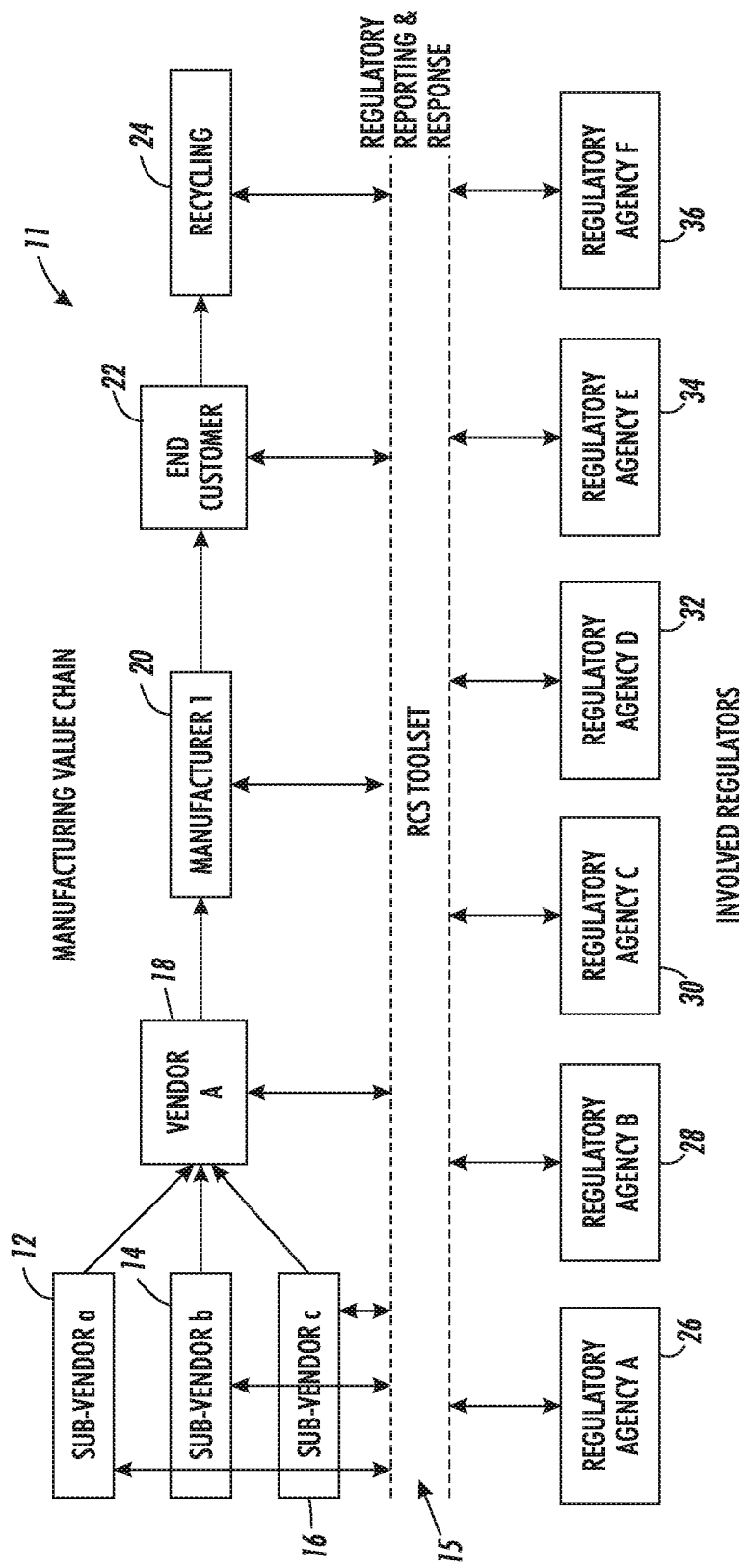
FIG. 2 illustrates a block diagram of a simplified system for regulatory compliance, in accordance with another example embodiment.

FIG. 2 illustrates a block diagram of a simplified system 11 for regulatory compliance, in accordance with another example embodiment. The system 11 is configured to address the above problems associated with system 10. Note that in FIGS. 1-2 and throughout the specification and other drawings herein, identical or similar parts are elements are generally indicated by identical reference numerals. The system 10 includes an RCS (Regulatory Compliance System) 15 (also referred to as an "RCS Toolset"). Note that the term "toolset" as utilized herein refers to a set of predefined computing tools that is associated with a particular computer application.

The RCS 15 can be implemented as a module or a group of modules that allow companies or organizations to meet emerging chemical regulatory requirements required by various agencies such as, for example, the example agencies 26, 28, 30, 32, 34, and/or 36 shown in FIG. 2. In general, the RCS 15 can be configured as a repository of a large amount of data that is potentially valuable to both the public and private sectors in the regulatory process.

The RCS 15 can be configured as an approval-risk identification engine or module for regulatory compliance that when utilized with system 11 shown in FIG. 2 minimizes the risk of not being able to comply as, for example, previously filed and reported by an organization (e.g., a company) applying for approval under, for example, new regulations and/or pending legislation. The RCS 15 also minimizes the risk of not being able to comply or file for regulatory approval because the company does not have all information required for compliance or filing. In addition, the RCS 15 minimizes a potentially long lead-time in the regulatory compliance approval process.

As shown in FIG. 2, private sector participants such as sub-vendors, vendors, manufacturers, end customers, recyclers, testers, other users, and so on, and public sector participants such as national, regional and/or municipal regulators can use the system 11 to organize and simplify their work processes, which in turn improves the efficiency of the underlying technology used in, for example, data storage, computer processing, memory management and so on.

In short, the RCS 15 acts as a broker of information between private industry's value chains and various regulators. As shown in FIG. 2 (compared to FIG. 1), even as the regulatory restrictions become more complex, the RCS broker simplifies communications among members of a manufacturing value chain that builds products with regulatory restrictions, and between the public and private sectors in a regulatory reporting relationship.

The RCS 15 can be configured to apply the following principles in its operation:

Data Aggregation for Report Content

Each national regulatory agency in each country has its own set of regulations. Regional agencies may build on the national requirements. State agencies may build on the regional requirements. Municipal agencies may also build on the state requirements. In short, each regulatory agency has different compliance requirements, even within a single context such as chemical regulatory compliance and therefore each requires different but overlapping information.

The RCS 15 can be configured to handle these different requirements. For example, in one embodiment, each regulator from each supported nation, region, state, and/or municipality supplies its latest forms to the RCS 15. From these forms, the RCS 15 manages a superset of all of the data fields required by all of the participating regulators. When a member of the value chain needs to report, the RCS 15 provides all of the fields required for the company's target regions (which the user specifies).

If a particular vendor decides to sell an existing product in a new region, the RCS automatically fills in the correct data for the new region (from the data already filled out) and only requests supplemental data required by the new region. When a vendor has filled out the required superset of information for its particular set of regulators and is ready to submit the data to those regulators, the RCS 15 automatically fills out the appropriate forms for each regulator and submits all the forms to all the target regulators. In this way, when a company is required to submit the same data to different regulators or at different times, it only needs to fill out the duplicate data once.

Once a regulator has approved a vendor's product, the RCS 15 stores that approval. In the future, when the vendor includes that product in another manufacturing supply chain to be sold in the same region (e.g., with the same regulatory agency), the RCS 15 includes that fact in its communication to the regulators so that the regulators (e.g., such as regulators 26, 28, 30, 32, 34 and/or 36) may not spend time re-approving that sub-component.

Localized Reporting and Information Hiding in Value Chains

In simple terms, a value chain participant such as one or more of the value chain participants 12, 14, 16, 18, 20, 22 and/or 24 can report on its own product model and/or on each individual product(s) or batches. But there are additional considerations that must be addressed. In some cases, a vendor (e.g., sub-vendors 12, 14, 16 and/or vendor 18) in the value chain may not be allowed to know how its product will be used in the final assembly. Similarly, a manufacturer such as the manufacturer 20 may not know, or may not be allowed to know the second-tier vendors (sub-vendors) that supply parts to its direct (first-tier) vendors. Additionally, no vendor wants its trade secrets and recipes exposed to its value chain partners.

Regulators, however, such as one or more of the regulators 26, 28, 30, 32, 34 and/or 36 may normally want to know whether all of components of a particular model or finished product complies. Therefore, such regulators may require all the information from all contributors to a product. This means that, based on a contractual agreement and regulatory rules, arbitrary product-component information must be available to some members of the value chain and the regulatory community and not to others. To handle these difficulties, the RCS 15 restricts disclosure in the value chain by localizing reporting to an individual value chain vendor and its direct suppliers as follows.

Using the RCS 15, each member of the value chain reports only on its own local product or products. As part of its report about its own product, a vendor accesses the appropriate, product-related reports submitted by its direct suppliers and links them to its own report. (Unless approved by the supplier, the vendor does not have access to the information in the supplier's report.) Thus, when a member of the value chain has (for example) two tiers of suppliers (a direct vendor and a sub-vendor), the second tier's supplier's (sub-vendor's) reporting is automatically included as part of the direct supplier's report.

As an example scenario when Manufacturer E submits its report, it only includes the reports of its direct suppliers, Vendor C and Vendor D. Sub-vendor A's report and Sub-vendor B's reports are automatically included in Manufacturer E's report. Manufacturer E, however, may be aware of those sub-reports and never sees them (unless authorized by Vendors A and B). Manufacturer E cannot see the content of the reports submitted by Vendors C and D (unless authorized by those vendors). All of the reports, however, are aggregated and available to the appropriate regulatory agencies. Note that In addition to simplification (as shown in FIG. 2), this method also offers the advantage of protecting the intellectual property of each value chain participant.

Report Aggregation for Model and Product Reporting and Intellectual Property Protection As described above (see the section titled "Data Aggregation for Report Content"), the RCS 15 aggregates a company's compliance data. The RCS 15 also aggregates all of the value chain reports for a particular model or product (see the section titled "Localized Reporting and Information Hiding in Value Chains" for more information).

Again, by way of an example, Manufacturer E may have a product model containing a restricted chemical. Manufacturer E files a report on the model by filling out the forms required by regulators in its target markets. The report includes the reports filed separately by Manufacturer E's direct suppliers (Vendor C and Vendor D) for Product 1 and Product 2 respectively. In information sent to the regulators, the RCS 15 automatically includes the reports filed separately by Manufacturer E's second-tier suppliers (Vendor A and Vendor B) for Chemical A and Chemical B respectively.

Note again that Manufacturer E doesn't know about Vendor A and Vendor B. In this way, intellectual property is protected. Additionally, with this approach each regulatory agency attains the information it requires from the entire value chain, even though the different agencies may need different information. Furthermore, as proof that a report has been submitted for a model or a product to one or more regulators, the RCS 15 can utilize a distributed ledger (e.g., Blockchain technology) to ensure that the submission is permanently and securely recorded and can be reconstructed if needed (e.g., for legal or other reasons).

Regulator Access and Response

When a regulatory agency participates in the RCS 15, the RCS 15 provides an option for the regulators to manually pull new reports (e.g. they are notified that new reports have been submitted) or to have the RCS 15 automatically send new reports to the regulator. (In some embodiments, the regulator can select additional options such as timing or different options for different manufacturers.)

Each regulator can view all of the filled-out forms that it requires for the entire product or model. Through the RCS 15, each regulatory agency can securely notify each vendor about its compliance or lack of compliance. Note that if a particular regulatory agency reviewing the model or product information has already approved a particular vendor's product, the RCS 15 indicates that in the model's report and the regulator doesn't have to take the time to reevaluate that vendor's product.

Once a regulator has approved a vendor's product, the RCS 15 stores that approval and passes it on to the vendor (by configuration automatically or manually be the vendor after notification). If the vendor does not pass the regulator's scrutiny, the regulator stores that information in the RCS 15 and the RCS 15 notifies the appropriate vendor (or, by configuration, the customer of that vendor) for additional information or corrective action.

Furthermore, as proof that each regulator has responded to a report submission, the RCS 15 can be configured to use a distributed ledger (e.g., Blockchain technology in some embodiments) to ensure that each response is permanently and securely recorded and can be reconstructed if needed.

Security

As a repository of private information for many companies, the RCS 15 can only succeed if it guarantees that the intellectual property it stores is secure. The section above titled "Report Aggregation for Model and Product Reporting and Intellectual Property Protection" describes how the RCS 15 can keep each vendor's intellectual property separate from the other companies in a value chain. Blockchain and other related technologies, for example, can help to ensure this separation.

Other security mechanisms may be required to ensure that unauthorized users cannot access data stored in the RCS 15, cannot insert invalid data into the RCS 15, and cannot influence people to unwittingly provide access to the RCS 15. This is, of course, a daunting task.

Privacy in the modern age is under attack by malicious agents who want to enrich themselves through theft, private companies that want to hawk their products more effectively, and governments that want to ensure a secure régime by unearthing terrorists and/or by controlling their own citizens. In the ongoing battle, it turns out that every system can be hacked. For example, Apple Computer of Cupertino, California has developed a mechanism to prevent access to information on personal devices by anyone except the owner of the device. The government is also prevented from seeking access to such information based on a warrant. To accomplish this, Apple has removed its technical ability to decrypt the contents of a client device such as an iPhone or an iPad. The U.S. government pursued legal action to remove that mechanism because it prevented the discovery and prosecution of criminals and terrorists. But ultimately, it turned out that hackers employed by the U.S. Federal Bureau of Investigation (FBI) were able to access such devices.

In short, personal and corporate information is not secure in our highly connected world. One of the difficulties preventing us from keeping our private data secure is that, in order for modern value chains to function, with all their promise for ease-of-use, convenience, simplicity, and lower cost, personal information must be stored on one or more systems. Such copies of our personal information must be accessed by external systems to be useful. Thus, the storage systems that must allow external access in order to be useful and profitable are, by their nature, also vulnerable to unauthorized external access. The more of these systems that exist, the more likely it is that at least one will be breached.

This problem is made worse by the growth of the Internet of Things (IOT), the emerging state of affairs where almost every object in the world is connected to the Internet. Very few of these IOT items are secure, making unauthorized access easier. In some cases such IOT devices can act as a portal to other private information as well. Furthermore, as demonstrated by the ongoing rash of data break-ins afflicting company after company, current solutions have not worked. Even biometrics, the hoped-for solution, has fallen short. Therefore, the security of the RCS 15 may not be completely secure using conventional technologies such as multi-factor authentication and the latest encryption technologies. The RCS 15, however, can be continually modified and equipped with the latest developing security technologies to address these issues.

Data Analysis

As described herein, the RCS 15 can be configured as a repository of a large amount of data that is potentially valuable to both the public and private sectors in the regulatory process. Different types of useful information can be generated from such data and then analyzed for additional actions, such as predictions, as discussed in further detail herein.

Figure 3:
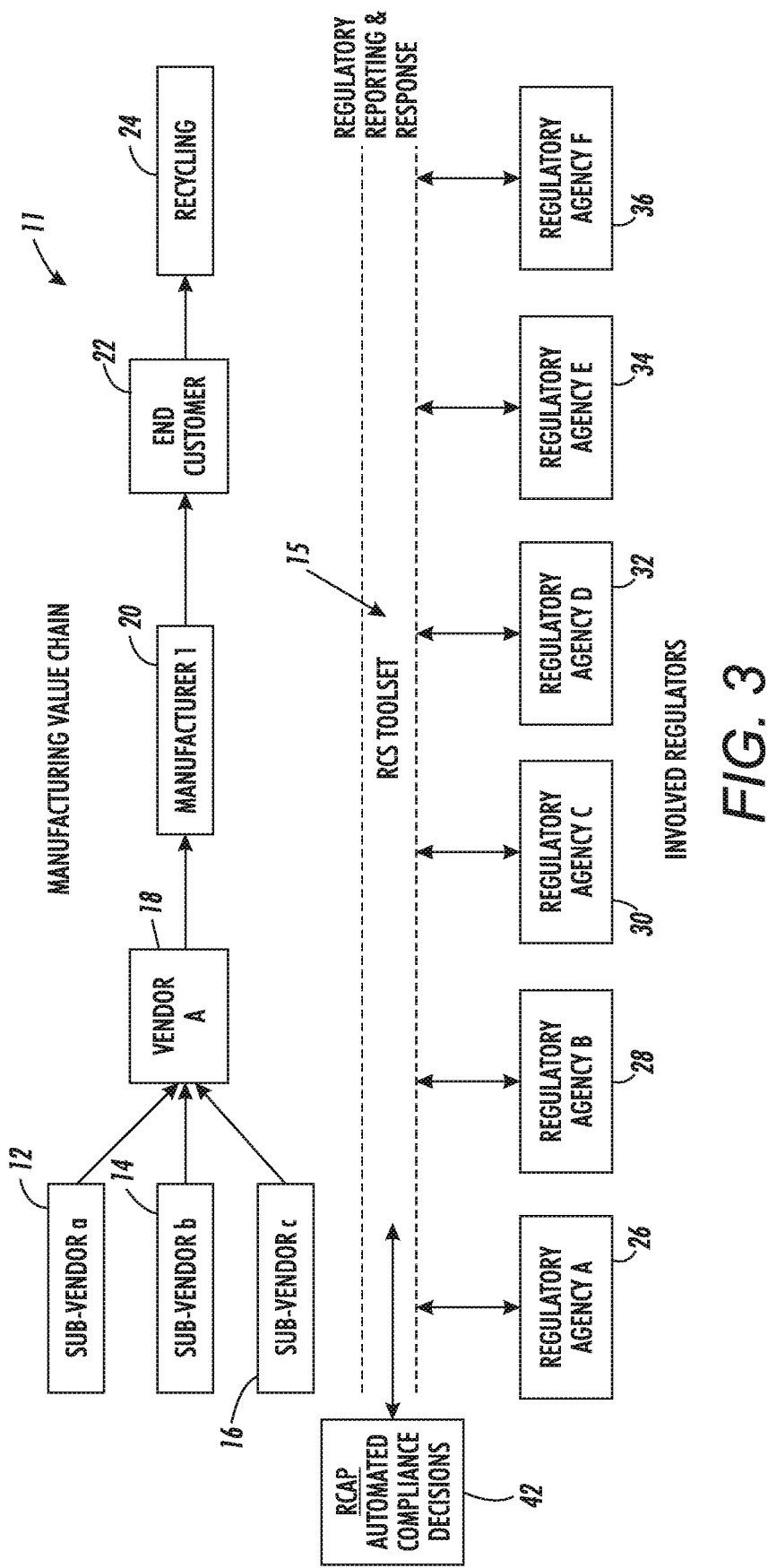
FIG. 3 illustrates a block diagram of a system for regulatory compliance, in accordance with yet another example embodiment.

FIG. 3 illustrates a block diagram of a system 40 for regulatory compliance, in accordance with yet another example embodiment. The system 40 is a modified version of the system 11 shown in FIG. 2, and thus represents an alternative embodiment. In system 11, RCAP (Regulatory Compliance Approval Prediction) module 42 can be configured to communicate with the RCS 15 to facilitate whether a particular regulatory agency (e.g., regulator 26, 28, 30, 32, 34 and/or 36) will approve a request for a particular type of submission for a particular manufacturer (e.g., such as manufacturer 20) or vendor (e.g., such as sub-vendors 12, 14, 16, and/or vendor 18) or other party (e.g., end customer 22, recycler 24, etc) in a value chain. The RCAP module 42 can be implemented as a module or a group modules or system to improve its predictive accuracy over time.

Each value-chain or supply-chain participant (a vendor, a manufacturer, a tester, etc.) can use the RCAP module 42 to develop more accurate plans for product manufacturing, launch, and/or delivery. In addition, the RCAP module 42 helps each participant more accurately determine any missing information that each individual regulatory agency will want. In short, the RCAP module 42 can act as an intelligent assistant to help companies and organizations improve the probability that their regulatory compliance submissions will be approved as quickly as possible by each target regulatory agency.

When the RCS 15 submits a request to a regulatory agency for approval on behalf of a company, for example, the RCAP module or system 42 predicts whether the requesting company will be approved and, if not, what additional data is required in order to receive approval: for the particular company, for the type of compliance (e.g. chemical compliance; but this system can be applied to any type of regulatory compliance), for the submitted data set, and for the historical data sets acquired by the RCS 15. Note that such criteria are discussed herein for exemplary purposes only and should not be considered a limiting feature of the disclosed embodiments. The RCAP module 43 can also include and utilize additional, interacting criteria.

It should be appreciated that a crucial differentiator from conventional systems and methods is that the accuracy of the RCAP system/module 42 for these and other criteria improves over time. It is also important to note that the disclosed approach can use both specific and published regulatory criteria. The disclosed embodiments, however, also can be configured to include in their decision-making criteria, the history of decision-making by each regulatory body against each vendor they approve or deny. This feature is not found in conventional approaches.

The RCAP module 42 can apply several principles in its operation including the data collection, and data analysis, compliance approval prediction, and improvement over time.

Data Collection

As discussed previously, the RCS 15 can be implemented as a module/system that collects data submitted by each company in a value chain or supply chain as requests for regulatory approval by particular regulators. The RCS 15 collates the data, and submits to each target regulatory agency only the data required by that agency (e.g., a request for a particular regulatory body to approve the inclusion of a restricted chemical in a manufactured part). The RCS 15 then collects each agency's response (e.g. approval; denial; request for more information) back to the appropriate value chain participant. As discussed previously, FIG. 2 illustrates the RCS's data collection from value chain participants and regulators. The RCS 15 can store such information.

Data Analysis, Compliance Approval Prediction, and Improvement Over Time

As the RCS 15 collects such data, the RCAP module 42 can analyze the data on an ongoing basis. Analysis by the RCAP module 42 provides a prediction to each value chain participant regarding whether its respective submission may be approved. The analysis by the RCAP module 42 can be granular. In particular, the RCAP 42 can predict whether the requesting company or organization can be approved and, if not, what additional data may be required in order to receive approval, at least for: the particular company, the particular regulatory agency, the type of compliance (e.g. chemical compliance), the type of restricted element (e.g. a particular chemical), the submitted data set, and/or the historical data sets acquired by the RCS 15. It should be appreciated that such criteria are not considered limiting features of the disclosed embodiments but are described herein for illustrative purposes only. For example, news events fall into another class of information that may be included in the RCAP analysis. The RCAP module 42 can also include or make use of additional, interacting criteria.

Using this information, RCAP module 42 can predict whether a particular regulator may deny a particular company's submission for the relevant category of compliance (e.g. chemical compliance). If the RCAP module 42 does predict that particular regulator may deny a particular company's or organization's submission, the RCAP 42 also describes what additional information that particular company may need to provide for that particular regulator for approval. The requesting companies merely have to enter the required data and then the RCS 15 can send the appropriate information to the appropriate regulators.

As the RCS 15 collects more data over time (e.g., data from the requesting companies/organizations and decisions from the regulators), the RCAP's predictive accuracy improves over time (this is a crucial differentiator from existing/conventional approaches). As discussed previously, the disclosed embodiments can use both specific and published regulatory criteria, which many conventional systems do not use. Note that the disclosed embodiments can also include in their decision-making criteria, the history of decision-making by each regulatory body against each vendor they approve or deny.

The ability to improve the RCAP's predictive accuracy over time can also lead to improvements in the underlying computing technology (e.g., the data processing system/computer used in processing operations/instructions associated with the RCAP, RCS, etc). That is, as the RCAP's predictive accuracy can improve, which can lead to faster processing times (e.g., via a CPU, microprocessor, etc. used in the underlying computing device(s)) along with improved memory management, and energy savings in the data processing system or computer(s) used in implementing the RCAP, RCS, etc.

Figure 4:
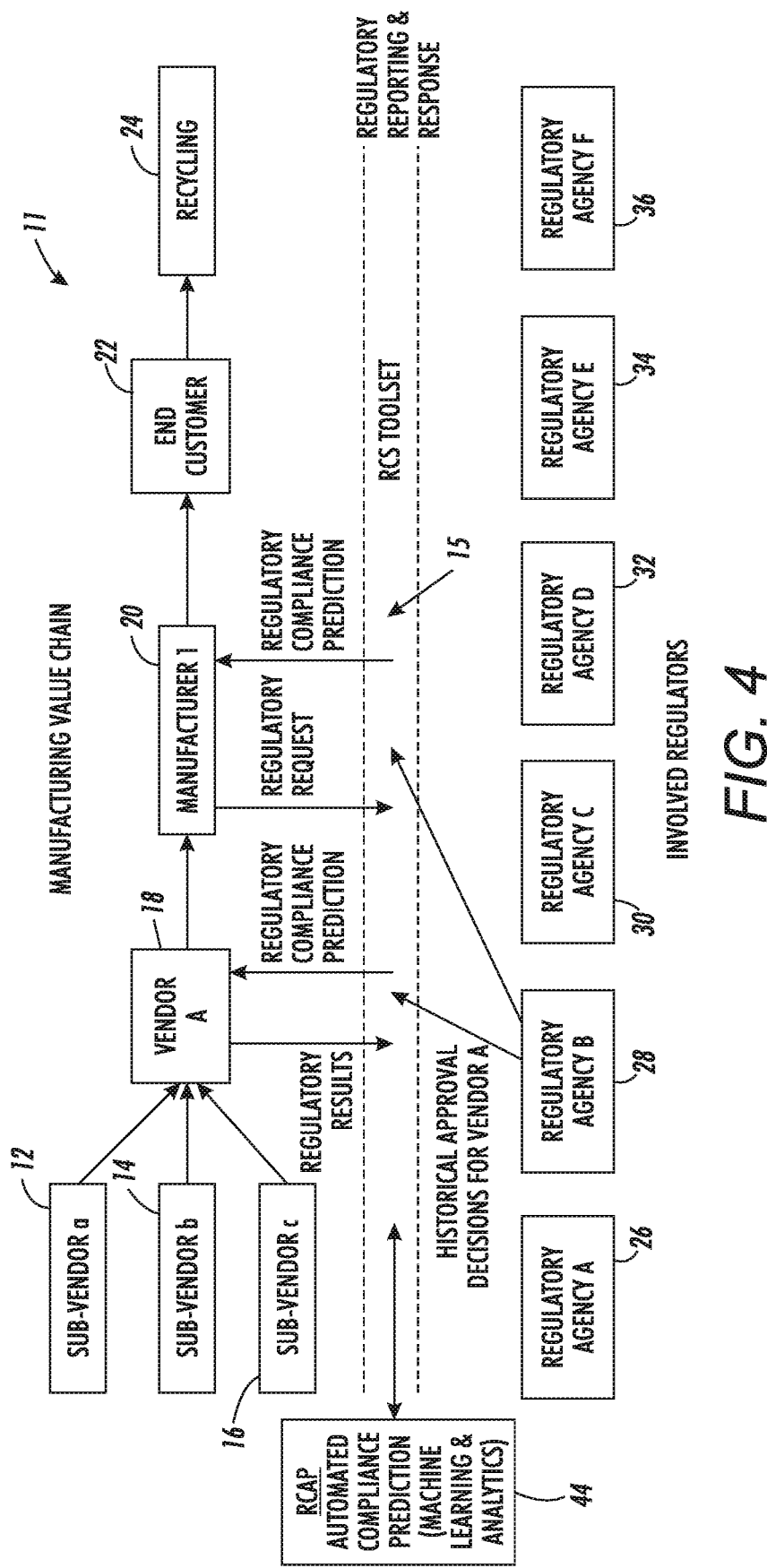
FIG. 4 illustrates a block diagram of a system for regulatory compliance that includes automated compliance prediction and prediction improvement, in accordance with still another example embodiment.

FIG. 4 illustrates a block diagram of a system 41 for regulatory compliance that includes automated compliance prediction and prediction improvement, in accordance with still another example embodiment. Note that the system 41 shown in FIG. 4 is an alternative version of the embodiment shown in FIG. 3. The alternative embodiment illustrated in FIG. 4, however, includes an RCAP module 44 that is configured with machine learning and analytics capabilities.

Note that the term "machine learning" as utilized herein can relate to a machine's ability to learn without being programmed (though it does need an initial dataset). The machine learning allows a machine to automatically analyze data and build analytical model. Machine learning uses various algorithms that iteratively learn from data. The machine learning allows machine to determine hidden insights without being explicitly programmed. For example, through machine learning, the machine may itself analyze connections between various users through their social media websites (e.g., connections) and may generate relation between users. The relationship between users may be direct or one-to-one or may be indirect, e.g., through one or more common connections. Through machine learning, the machine may be able to determine the direct and indirect relation between users and organizations by analyzing, for example, their social media websites and connections.

Machine learning classification algorithms can be used to make the predictions described herein (see the section below on "Efficacy" for more on machine learning and its application to the disclosed embodiment). Different and/or additional algorithms (and/or criteria) may be used in other embodiments to enhance predictive capabilities in the future.

In addition (as described below), the disclosed methods of machine learning can allow such algorithms to improve its predictive performance over time. The following are examples of types of data that can be utilized and analyzed via machine learning, for example, to provide such predictive capabilities. Many other data elements can also be included in various embodiments.

Past acceptance of answers to common/shared questions. The Regulatory Compliance System provides the capability for common/shared questions to be answered automatically. If these questions have been previously reviewed and approved, then the likelihood of them being approved again can be greatly enhanced.

Compliance Type. The type of compliance being sought (such as Air Quality vs. Water Quality) allows for more specific predictions to be made than treating all submissions the same.

Industry Type. The industry and/or regulator that the submission is for can be used as a grouping filter for determining success since what can be considered required/crucial in one industry can be less important in another. This is similar, but different from, the Compliance Type factor stated above.

Target Regulatory Agency/Approver. The agency that is performing the review may also be a limiting factor when determining the chances for success. Previous responses from the same agency could have a higher weight than other agencies within the same industry. Furthermore, the individual performing the review may also be a factor in the outcome of the review.

Submitting/Requesting Company. The past history of the company submitting the request to a particular regulatory agency is also a factor. For example, the agency that is performing the review of a particular company's request may respond differently than it did to a similar request (i.e. using the same data) by a different company. Previous responses from a particular agency to a particular requestor-company could have a higher weight than that agency's response to a different requestor. Furthermore, the individual performing the review may also be a factor in the outcome of the response to a particular requesting company. This can be linked to the previous method as well as given an overall rating/prediction based on all submissions to all agencies.

Results from previous submissions (general). The outcomes from all previous submissions, whether positive or negative, and regardless of other factors, can also lead to better predictions.

Formulated responses from the Agency/Approver. Using text-parsing capabilities with keyword sensitivities, the system can identify each regulatory agency's common rejection reasons (e.g., such as "not enough detail"). This information can be used to help the submitter respond to the problem (e.g., ensuring enough detail is provided) while also aiding in the predictive calculation of whether the submitter's answer may be accepted or not.

Chemical Dataset/Components. For the example of chemical regulatory compliance, the types and classifications of the various chemicals used in the creation of the product can also raise or lower the risk of approval. For example, this algorithm elevates the level of detail and scrutiny a reviewer would be expected to undertake for classes of chemicals that are considered highly dangerous in their use (unusual sensitivities to light, heat, etc.). Training the algorithm to place these kinds of chemicals into weighted groups can result in better predictions.

Predicted Outcome

By combining the output from the above classification algorithms (and, in other embodiments, with additional algorithms), one or more of the following example outcomes can be predicted (additional outcomes may be included in other embodiments):

Approved—the likelihood of this submission being approved by all of the target regulatory agencies is high.

Denied—it is very likely that this submission may be rejected by all of the target agencies. Some of the algorithms defined above may provide guidance on where the submission might be lacking, and require additional input (that is: how to update the submission to improve the probability that each particular regulatory agency may approve the submission; this means that the additional recommended input may be different for different target agencies).

Approved by Some Agencies/Denied by Some Agencies—it is very likely that this submission can be approved by a particular set of target agencies but may be rejected by other target agencies. Some of the algorithms defined above may provide guidance on where the submission might be lacking and require additional input for each target agency (i.e., how to update the submission for each target agency to improve the probability that all target agencies may approve the submission).

Undetermined—based on the available data, a proper determination could not be established. This most likely means that more information may be required from the requestor in order to provide a better prediction or that one or more of the algorithms have not yet been sufficiently trained to respond to the current submission.

In addition to the outcome determination, a probability score can be assigned showing how confident the RCAP module 44 is with its analysis for each agency (e.g., the higher this score, the more confident the system is). In determining the outcome and confidence score, in one example embodiment the RCAP module 44 can assign weights to the various predictive classification algorithms based on their accuracy in predicting the actual outcome. For instance, if the output from the Chemical Dataset classification algorithm is correct in 95% of all submissions, its output may be assigned a higher weight that another classification algorithm that is only successful, for example, 30% of the time.

The overall effectiveness of each classification algorithm can be constantly monitored with the goal of continually increasing their effectiveness. In many cases, an algorithm's effectiveness can be improved. But with early data sets, or as the amount of data in the datasets increases, the accuracy of these algorithms may decline (e.g. depending on the quality of the data being submitted). Monitoring each algorithm's results can prevent these declines from becoming a problem by alerting the RCAP's administrators that an algorithm requires a modification to the classification techniques being used.

Note that positive and negative feedback loops are common in machine learning (see the section below on "Efficacy" for more on Machine Learning and its application to this invention) and both can have detrimental effects on the effectiveness of the algorithms. This happened, for example, with the Google Translate statistical machine learning engine or module when it was released to a wider audience. Translation loops (e.g., English to German to Spanish to Russian to English) were introduced by end users that slowly degraded the overall effectiveness of the original algorithm requiring that it be adjusted.

Examples of Efficacy

Machine learning systems can operate as high volume correlation engines/modules. That is, as a machine learning engine, for example, takes in new data, it constantly updates the value of each data element in determining a particular result. Note that as described herein, machine learning is not a requirement of the disclosed embodiments, but can be implemented in the context of machine learning embodiments. Machine learning is one application that can assist in rendering the disclosed embodiments more effective and automated and also contribute to improved efficiencies in computing technologies, such as improved processing times by a processor and memory management.

For example, a great deal of the information that may be gathered currently is stored in paper form (but this may change in the future as most if not all such information may be stored in electronic formats). People could manually study these paper documents, however, and determine that in the "Chemical Composition" field on a Compliance Approval Request Form, if the chemical "Mercury" is included with greater than 0.1% of the total volume of the chemical recipe:

Region 5 of the New York Department of Environmental Conservation rejects the request 30% of the time.
Region 2 of the New York Department of Environmental Conservation rejects the request 60% of the time.
Region K of the New Jersey Department of Environmental Conservation rejects the request 80% of the time From this information one could manually infer the result of a Compliance Approval Request for these few data points. Machine learning, however, automates this process and can compare many different variables against hundreds or thousands or millions of actual approval-request results and can discover and give different weights to each of the different data elements based on those actual results. In addition, a machine learning engine or module, for example, can evaluate the accuracy of its own previous predictions and include that as additional data to improve its future predictions. It is also important to reiterate that the probabilities produced by machine learning engines/modules change constantly as new data comes into the system. The engine's predictions may change over time as its data set becomes larger and as its correlations mature.

Such machine learning functions ultimately serve to improve not only the efficiency of predicting regulatory requests as discussed herein, but also to improve the functioning and efficiency of the underlying technology. That is, the use of such machine learning functionalities can also lead to improvements in, for example, the speed and efficiency of a computer processor (e.g., processing by a CPU), memory management and energy savings (i.e., more efficient computing operations can lead the use of less power in the computing device). The disclosed embodiments thus can lead to improvements in the underlying computing technologies used to implement the disclosed embodiments.

FIG. 4 illustrates examples of various variables involves in the machine learning application of system 41. For example, the RCS 15 receives data from, for example, regulator 28 (Regulatory Agency B), such as "historical approval decisions" with respect to the vender 18 and "historical approval decisions" with respect to the manufacturer 20. The RCS 15 also receives data such as "regulatory requests" from vendor 18 and "regulatory requests" from manufacturer 20, and can further provide regulatory compliance prediction data with respect to vendor 18 and manufacturer 20. Such prediction data results from processing of data by the machine learning/analytics capabilities of RCAP module 44. For example, the RCAP module 44 can include or may communicate with an associated machine learning engine or module, or other machine learning element.

Figure 5A:
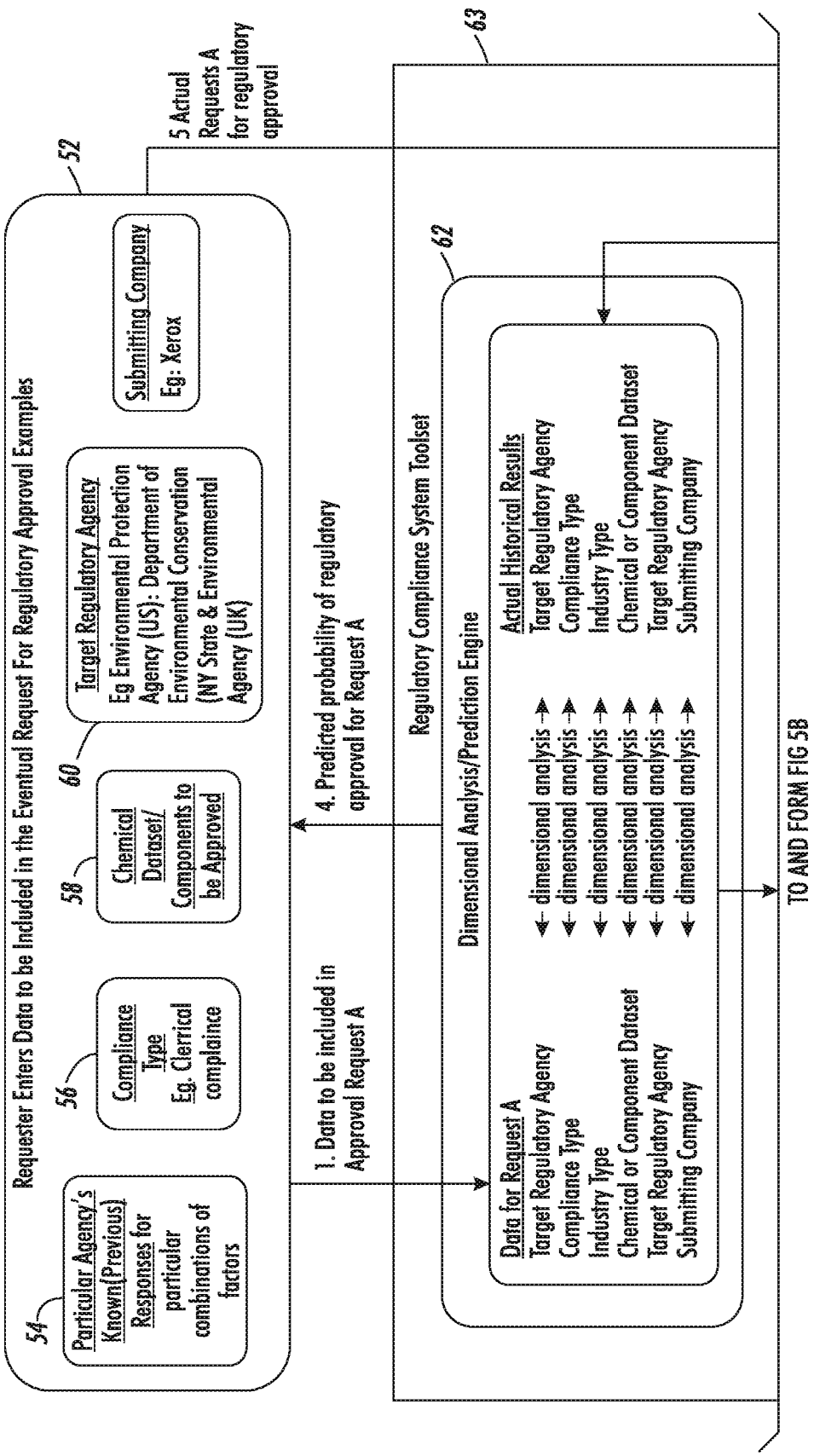
FIGS. 5A-5B illustrates a flow diagram depicting logical operational steps or a method for predicting the probability of regulatory approval, in accordance with an example embodiment.
Figure 5B:
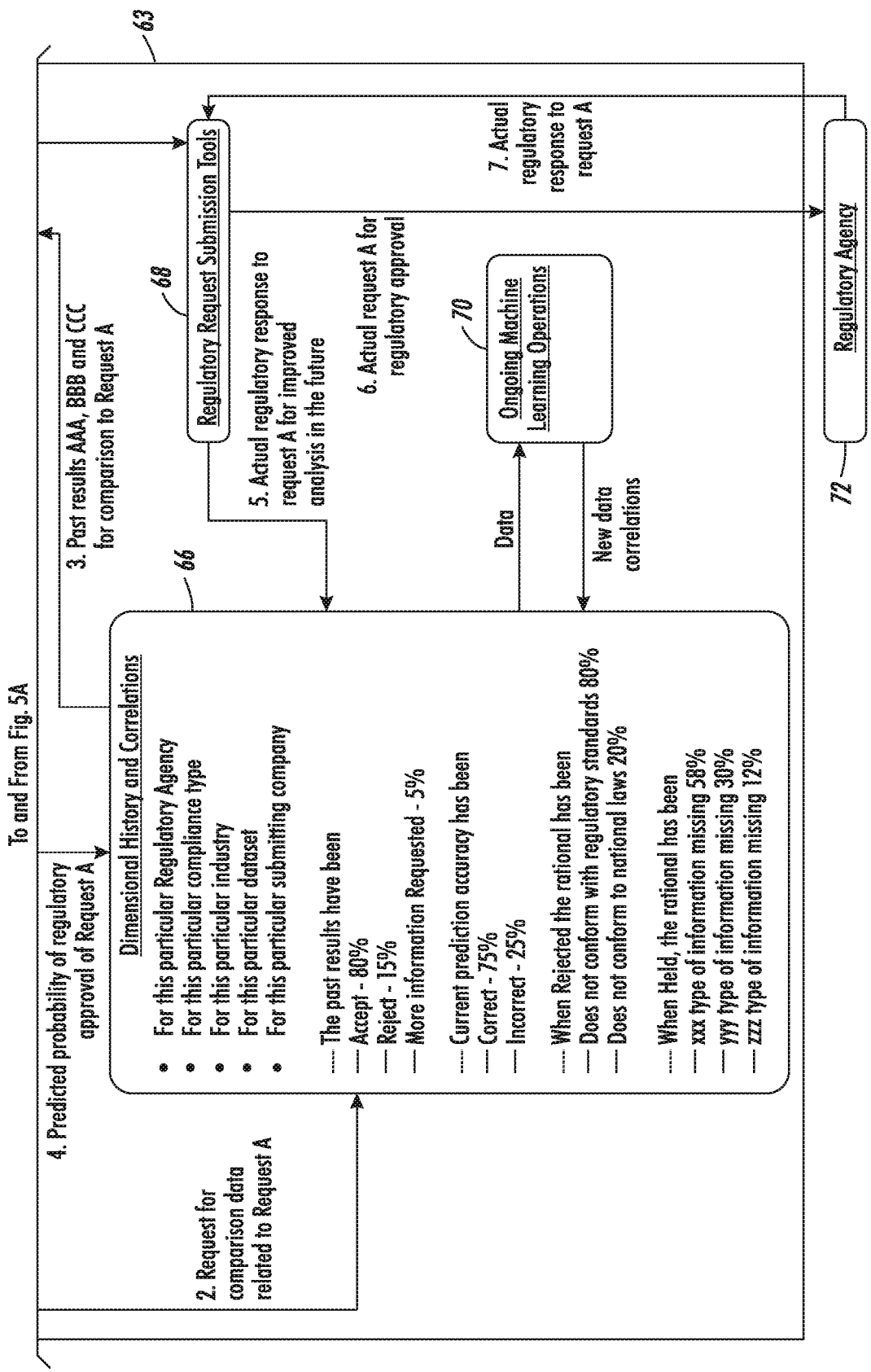

FIGS. 5A-5B illustrates a flow diagram depicting logical operational steps of a method for predicting the probability of regulatory approval, in accordance with an example embodiment. As indicated at block 52, a requester enters data to be included in an eventual request for regulatory approval. Such data can be include in a dataset 52. Such data may include information such as, for example, a particular agency's known/previous responses for a particular combination of factors, as shown at block 54. Such data can also include compliance type information (e.g., chemical compliance) as indicated at block 56, and, for example, particular dataset components to be approved, as illustrated at block 58. Such data can further include information identifying or concerning the targeted regulatory agency, as shown at block 60 (e.g., such as federal, state and/or municipal agencies). Such data can further include, for example, the name of the submitting company or organization as illustrated at block 52.

An example RCS Toolset is shown in FIG. 5 As indicated at block 63, which is analogous to the RCS 15 discussed previously. The RCS Toolset shown at block 63 can be utilized in some embodiments as, for example, the RCS 15. In any event, in the example shown in FIG. 5A, the RCS Toolset depicted at block 63 includes various modules and components such as a dimensional analysis/prediction engine as shown at block 62, a module that provides dimensional history and correlations as indicated at block 66, a module that provides ongoing machine learning operations as described at block 70, and regulatory request submission tools as illustrated at block 68. The regulatory agency is indicated at block 72.

Figure 6:
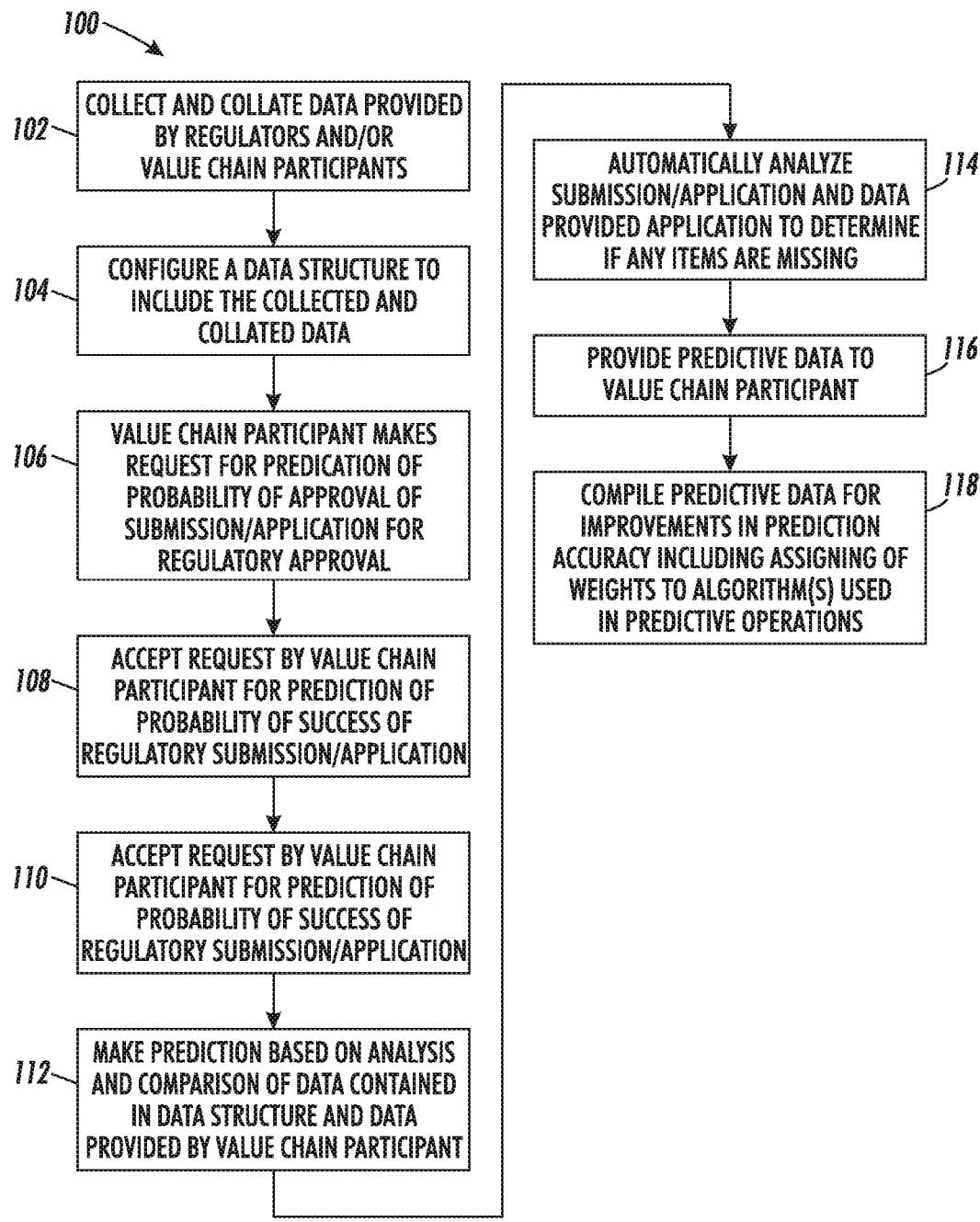
FIG. 6 illustrates a flow chart of operations depicting logical operational steps of a method for predicting whether a particular regulatory agency will approve a request for a particular type of submission for a particular manufacturer or vendor in a value chain, in accordance with an example embodiment.

The following flow is generally shown in FIGS. 5A-5B:
1. Data to be included in Approval Request A
2. Request for comparison data related to Request A
3. Put results AAA, BBB, and CCC for comparison into Request A 4. Predicted probability of regulatory approval for Request A
5. Actual Request A for regulatory approval
6. Actual Request A for regulatory approval
7. Actual regulatory response to Request A
8. Actual regulatory response to Request A for improved analysis in the future FIG. 6 illustrates a flow chart of operations depicting logical operational steps of a method 100 for predicting whether a particular regulatory agency may approve a request for a particular type of submission for a particular manufacturer or vendor in a value chain, in accordance with another example embodiment. It should be appreciated that the various steps, operations or instructions of the method 100 shown in FIG. 6 can be performed in a different order and/or with fewer or more steps or operations. The particular ordering and arrangement of steps, operations or instructions shown in FIG. 6 are presented for exemplary purposes only and should not be considered a limiting feature of the disclosed embodiments.

As shown at block 102, a step or operation can be implemented to collect and collate data provided by one or more regulators such as, for example, the previously discussed regulators 26, 28, 30, 32, 34 and/or 36, and/or one or more value chain participants such as, for example, the sub-vendors 12, 14, and/or 16, the vendor 18, the manufacturer 20 and so on as discussed previously. The RCS 15 can be utilized to collect data submitted by each company in a value chain or a supply chain as requests for regulatory approval by particular regulators.

The RCS 15 can also be utilized to collate the data, and submits to each target regulatory agency only the data required by that agency (e.g., a request for a particular regulatory body to approve the inclusion of a restricted chemical in a manufactured part). The RCS 15 can thus be utilized to implement the operation shown at block 102. The RCS also collects each agency's response (e.g. approval; denial; request for more information) back to the appropriate value chain participant.

As shown next at block 104, a data structure can be configured which includes the aforementioned collected and collated data. Such data can include, for example, data indicative of actual approval-request results of applications/submissions for regulatory approval along with other data (e.g., assigned weights/weighted data). Next, as shown at block 106, a step or operation can be implemented in which a value chain participant makes a request for a prediction of the probability that an application/submission by the value chain participant (or by another party) may be approved.

As indicated next at block 108, a step or operation can be implemented in which the prediction probability request by the value chain participant is accepted. Once the request is accepted, an operation can be implemented, as shown at block 110 to compare data contained in the data structure to data provided by the value chain participant (e.g., data such as the submission/application and other information provided by the participant). This comparison and analysis step operation can be performed by, for example, the RCAP 44 including machine learning modules/engines that the RCAP 44 uses as part of its comparison and analysis operation.

Thereafter, as shown at block 112, a step or operation can be implemented to make the prediction of the probability that the value chain participant's application/submission may be approved. An additional step or operation can be implemented, as depicted at block 114 to automatically analyze the value chain participant's submission/application to determine if any items are missing. That is, the operation/step shown at block 114 predicts what is missing for a regulatory approval application.

Thereafter, as illustrated at block 116, a step or operation can be implemented to provide the aforementioned predictive data (e.g., probability that the submission/application may be approved and information concerning any possible missing items). Then, as shown at block 118, a step or operation can be provided to compile/organize the predictive data for improvements in predictive accuracy. This information can be collected, organized and analyzed over time. Note that the operation shown at block 118 can involve the RCAP module 44, for example, assigning weights to the various predictive classification algorithms based on their accuracy in predicting an actual outcome.

As can be appreciated by one skilled in the art, example embodiments can be implemented in the context of a method, data processing system, or computer program product. Accordingly, some embodiments may take the form of an entirely hardware embodiment, an entirely software embodiment or an embodiment combining software and hardware aspects all generally referred to herein as a "circuit" or a "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, and so on.

Computer program code for carrying out operations of the present invention may be written in an object oriented programming language (e.g., Java, C++, etc.). The computer program code, however, for carrying out operations of particular embodiments may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., Wi-Fi, Wimax, 802.xx, and cellular network or the connection may be made to an external computer via most third party supported networks (for example, through the Internet utilizing an Internet Service Provider).

The disclosed example embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks.

To be clear, the disclosed embodiments can be implemented in the context of, for example a special-purpose computer or a general-purpose computer, or other programmable data processing apparatus or system. For example, in some example embodiments, a data processing apparatus or system can be implemented as a combination of a special-purpose computer and a general-purpose computer.

The aforementioned computer program instructions may also be stored in a computer-readable memory (e.g., such as the example memory 342 shown in FIG. 7) that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
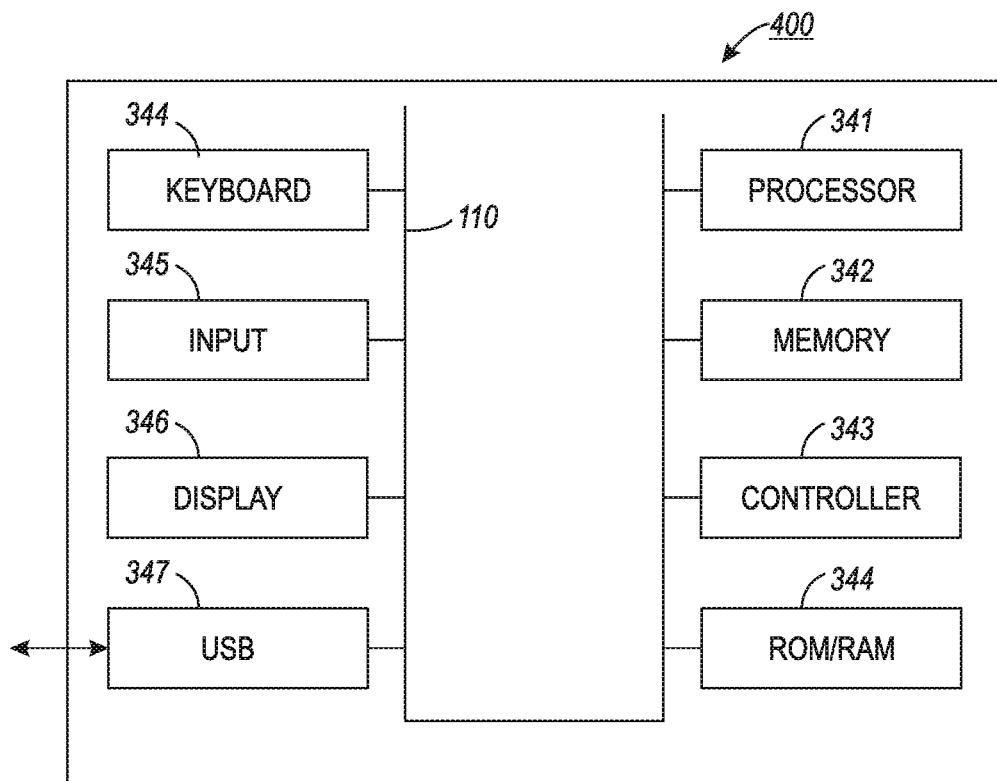
FIG. 7 illustrates a schematic view of a computer system, in accordance with an embodiment.
Figure 8:
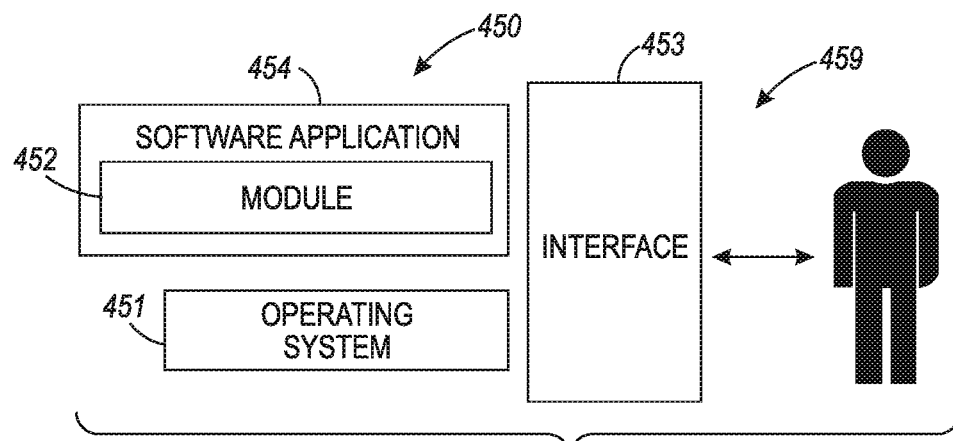
FIG. 8 illustrates a schematic view of a software system including a module, an operating system, and a user interface, in accordance with an embodiment.

FIGS. 7-8 are shown only as exemplary diagrams of data-processing environments in which example embodiments may be implemented. It should be appreciated that FIGS. 7-8 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 7, some embodiments may be implemented in the context of a data-processing system 400 that can include, for example, one or more processors such as a processor 341 (e.g., a CPU (Central Processing Unit) and/or other microprocessors), a memory 342, a controller 343, additional memory such as ROM/RAM 332 (i.e. ROM and/or RAM), a peripheral USB (Universal Serial Bus) connection 347, a keyboard 344 and/or another input device 345 (e.g., a pointing device, such as a mouse, track ball, pen device, etc.), a display 346 (e.g., a monitor, touch screen display, etc) and/or other peripheral connections and components.

The system bus 110 serves as the main electronic information highway interconnecting the other illustrated components of the hardware of data-processing system 400. In some embodiments, the processor 341 may be a CPU that functions as the central processing unit of the data-processing system 400, performing calculations and logic operations required to execute a program. Such a CPU, alone or in conjunction with one or more of the other elements disclosed in FIG. 4, is an example of a production device, computing device or processor. Read only memory (ROM) and random access memory (RAM) of the ROM/RAM 344 constitute examples of non-transitory computer-readable storage media.

The controller 343 can interface with one or more optional non-transitory computer-readable storage media to the system bus 110. These storage media may include, for example, an external or internal DVD drive, a CD ROM drive, a hard drive, flash memory, a USB drive or the like. These various drives and controllers can be optional devices. Program instructions, software or interactive modules for providing an interface and performing any querying or analysis associated with one or more data sets may be stored in, for example, ROME and/or RAM 344. Optionally, the program instructions may be stored on a tangible, non-transitory computer-readable medium such as a compact disk, a digital disk, flash memory, a memory card, a USB drive, an optical disc storage medium and/or other recording medium As illustrated, the various components of data-processing system 400 can communicate electronically through a system bus 351 or similar architecture. The system bus 351 may be, for example, a subsystem that transfers data between, for example, computer components within data-processing system 400 or to and from other data-processing devices, components, computers, etc. The data-processing system 400 may be implemented in some embodiments as, for example, a server in a client-server based network (e.g., the Internet) or in the context of a client and a server (i.e., where aspects are practiced on the client and the server).

In some example embodiments, data-processing system 400 may be, for example, a standalone desktop computer, a laptop computer, a Smartphone, a pad computing device and so on, wherein each such device is operably connected to and/or in communication with a client-server based network or other types of networks (e.g., cellular networks, Wi-Fi, etc).

FIG. 8 illustrates a computer software system 450 for directing the operation of the data-processing system 400 depicted in FIG. 7. The software application 454, stored for example in memory 342 and/or another memory, generally includes one or more modules such as module 452. The computer software system 450 also includes a kernel or operating system 451 and a shell or interface 453. One or more application programs, such as software application 454, may be "loaded" (i.e., transferred from, for example, mass storage or another memory location into the memory 342) for execution by the data-processing system 400. The data-processing system 400 can receive user commands and data through the interface 453; these inputs may then be acted upon by the data-processing system 400 in accordance with instructions from operating system 451 and/or software application 454. The interface 453 in some embodiments can serve to display results, whereupon a user 459 may supply additional inputs or terminate a session. The software application 454 can include module(s) 452, which can, for example, implement instructions or operations such as those discussed herein. Module 452 may also be composed of a group of modules.

The following discussion is intended to provide a brief, general description of suitable computing environments in which the system and method may be implemented.

Although not required, the disclosed embodiments will be described in the general context of computer-executable instructions, such as program modules, being executed by a single computer. In most instances, a "module" can constitute a software application, but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc. In some example embodiments, the term "module" can also refer to a modular hardware component or a component that is a combination of hardware and software. Examples of modules include the various modules discussed and described herein. A module or group of modules can implement the various elements, instructions, steps and/or operations described herein.

FIGS. 7-8 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms and/or operating systems, including, for example, Macintosh/Apple (e.g., Mac OSx, iOS), UNIX, LINUX, Windows, Android, and so on.

It is understood that the specific order or hierarchy of steps, operations, or instructions in the processes or methods disclosed is an illustration of exemplary approaches. Based upon design preferences, it is understood that the specific order or hierarchy of such steps, operation or instructions in the processes or methods discussed and illustrated herein may be rearranged. The accompanying claims, for example, present elements of the various steps, operations or instructions in a sample order, and are not meant to be limited to the specific order or hierarchy presented.

Based on the foregoing, it can be appreciated that a number of preferred and alternative embodiments are disclosed herein. For example, in one embodiment a method for automatically predicting a probability of regulatory compliance approval based on data contained in a data structure can be implemented. Such a method can involve a step, operation or instructions such as, for example, configuring a data structure that includes data collated and collected from a group of regulators and a group of value chain participants, wherein the data inclusive of data indicative of actual approval-request results of applications for regulatory approval. For example, in the case of chemical regulatory applications, such data may include information concerning whether a particular regulator denied an application by that particular value chain participant for the exact regulated chemical in the past and whether adding the requested information changed that regulatory decision.

Such a method can further include a step, operation or instruction of predicting the probability that an application for regulatory approval by a value chain participant among the group of value chain participants will be approved by a particular regulator among the group of regulators based on the data collated and collected from the group of regulators and contained in the data structure including the actual approval-request results of applications for regulatory approval.

In some example embodiments, additional steps, or operations or instructions can be implemented, such as predicting potential items that may be missing in the application that are potentially needed by the particularly regulator for the regulatory approval of the application; and providing a summary of the potential items that may be missing in the application that are potentially needed by the particular regulator for the regulatory approval of the application.

In another example embodiment, a step, operation or instruction can be implemented for improving the accuracy of predicting the probability that the application by the value chain participant for the regulatory approval can be approved by analyzing results of the predicting the plurality over a period of time (e.g., over an interval of time). In addition, a step, operation instruction can be provided for predicting the probability that the application by the value chain participant for regulatory approval can be approved, utilizing a classification algorithm.

In still another example embodiment, a step, operation or instruction can be implemented for predicting the probability that the application by the value chain participant for regulatory approval can be approved, utilizing a machine learning engine.

In some example embodiments, the machine learning engine can be configured to function as a high volume correlation engine that as the high volume correlation engine takes in new data, the high volume correlation engine constantly updates a value of each data element in the data structure in determining a predicted outcome. In still another example embodiment, the predicted outcome of the high volume correlation engine ca be, for example, a predicted outcome such as: approval, denial, approved by the particular regulator but not by another regulator, and undetermined. The predicted outcome is based on specific regulatory criteria and published regulatory criteria.

In another example embodiment, a system for automatically predicting a probability of regulatory compliance approval based on data contained in a data structure can be implemented, which includes one or more processors and a non-transitory computer-usable medium embodying computer program code. The non-transitory computer-usable medium is configured to communicate with the one or more processors, and the computer program code includes instructions executable by the one or more processors and configured for: providing a data structure comprising data collated and collected from a group of regulators and a group of value chain participants, the data inclusive of data indicative of actual approval-request results of applications for regulatory approval; and predicting a probability that an application for regulatory approval by a value chain participant among the group of value chain participants can be approved by a particular regulator among the group of regulators based on the data collated and collected from the group of regulators and contained in the data structure including the actual approval-request results of applications for regulatory approval.

In another example embodiment, an apparatus for automatically predicting the probability of regulatory compliance approval based on data contained in a data structure can be implemented. Such an apparatus can include, for example, an RCS (Regulatory Compliance System) that provides a data structure comprising data collated and collected from a group of regulators, the data inclusive of data indicative of actual approval-request results of applications for regulatory approval. Such an apparatus can further include RCAP (Regulatory Compliance Approval Prediction) system for predicting a probability that an application by a value chain participant for regulatory approval can be approved by at least one regulator among a group of regulators based on the data collated and collected from the group of regulators and contained in the data structure including the actual approval-request results of applications for regulatory approval.

The RCAP can be configured to predict potential items that may be missing in the application that are potentially needed by the particular regulator for the regulatory approval of the application, and provide a summary of the potential items that may be missing in the application that are potentially needed by the particular regulator for the regulatory approval of the application. The RCAP can thus provide the value chain participant with specific information (and even increasingly granular information) about which particular regulator among the group or group of regulators requires which information.

As discussed previously herein, the RCAP automatically improves the accuracy of the predicting of the probability that the application by the value chain participant for the regulatory approval can be approved by the at least one regulator among the group of regulators by analyzing results of the predicting the plurality over time.

In addition, such an improvement in the accuracy prediction by the RCAP over time can lead to improvements in, for example, the processing speed of a processor (because a more efficient prediction operation may mean faster processing times), improvements in memory management and improved power savings in one or more data-processing systems implementing the RCAP and the RCS.

Based on the foregoing, it can be appreciated that a number of preferred and alternative example embodiments are disclosed herein. For example, in a preferred embodiment a method for automatically predicting a probability of regulatory compliance approval based on data contained in a data structure can be implemented. Such a method can include steps or operations such as, for example, configuring a data structure comprising data collated and collected from a plurality of regulators and a plurality of value chain participants, the data inclusive of data indicative of actual approval-request results of applications for regulatory approval; and predicting a probability that an application for regulatory approval by a value chain participant among the plurality of value chain participants can be approved by a particular regulator among the plurality of regulators based on the data collated and collected from the plurality of regulators and contained in the data structure including the actual approval-request results of applications for regulatory approval.

In another example embodiment, steps or operations can be implemented for predicting potential items that may be missing in the application that are potentially needed by the particularly regulator for the regulatory approval of the application; and providing a summary of the potential items that may be missing in the application that are potentially needed by the particular regulator for the regulatory approval of the application.

In still another example embodiment, a step or operation can be implemented for improving the accuracy of predicting the probability that the application by the value chain participant for the regulatory approval can be approved by analyzing results of the predicting the plurality over an interval of time. In another example embodiment, a step or operation can be implemented for predicting the probability that the application by the value chain participant for regulatory approval can be approved, utilizing a classification algorithm. In yet another example embodiment, a step or operation can be implemented for predicting the probability that the application by the value chain participant for regulatory approval can be approved, utilizing a machine learning engine.

In another example embodiment, the aforementioned machine learning engine can function as a high volume correlation engine that as the high volume correlation engine takes in new data, the high volume correlation engine constantly updates a value of each data element in the data structure in determining a predicted outcome. In another example embodiment, the predicted outcome of the high volume correlation engine comprises one or more of the following predicted outcomes: approval, denial, approved by the particular regulator but not by another regulator among the plurality of regulators, and undetermined. In yet another example embodiment, the predicted outcome can be based on specific regulatory criteria and published regulatory criteria.

In still another example embodiment, a system for automatically predicting a probability of regulatory compliance approval based on data contained in a data structure can be implemented. Such a system can include at least one processor; and a non-transitory computer-usable medium embodying computer program code. The non-transitory computer-usable medium is configured to communicate with the at least one processor. The computer program code includes instructions executable by the at least one processor and configured for: providing a data structure comprising data collated and collected from a plurality of regulators and a plurality of value chain participants, the data inclusive of data indicative of actual approval-request results of applications for regulatory approval; and predicting a probability that an application for regulatory approval by a value chain participant among the plurality of value chain participants can be approved by a particular regulator among the plurality of regulators based on the data collated and collected from the plurality of regulators and contained in the data structure including the actual approval-request results of applications for regulatory approval.

In still another example embodiment, an apparatus for automatically predicting the probability of regulatory compliance approval based on data contained in a data structure can be implemented. Such an apparatus can include an RCS (Regulatory Compliance System) that provides a data structure comprising data collated and collected from a plurality of regulators, the data inclusive of data indicative of actual approval-request results of applications for regulatory approval; and an RCAP (Regulatory Compliance Approval Prediction) system for predicting a probability that an application by a value chain participant for regulatory approval can be approved by at least one regulator among a plurality of regulators based on the data collated and collected from the plurality of regulators and contained in the data structure including the actual approval-request results of applications for regulatory approval.

In some example embodiments, the RCAP can be further configured to predict potential items that may be missing in the application that are potentially needed by the particular regulator for regulatory approval of the application; and to provide a summary of the potential items that may be missing in the application that are potentially needed by the particular regulator for the regulatory approval of the application.

The RCAP automatically can improve the prediction accuracy by analyzing the prediction results over time. In addition, improvements in the prediction accuracy by the RCAP over time leads to improvements in, for example, the processing speed of the processor (e.g., a data-processing system, data-processing apparatus, CPU, microprocessor, etc), improvements in memory management and improved power savings in at least one data-processing system implementing the RCAP and the RCS.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for automatically predicting a probability of regulatory compliance approval based on data contained in a data structure, comprising:
    configuring said data structure comprising first data collated and collected from a plurality of regulators and a plurality of value chain participants, said data structure provided by an RCS (Regulatory Compliance System) that collates the first data and restricts disclosure in a value chain by localizing reporting to an individual value chain participant among the plurality of value chain participants and direct suppliers, said first data inclusive of second data indicative of actual approval-request results of applications for regulatory approval and other data including assigned weights and weighted data, the RCS further operable to use a distributed ledger to ensure that responses from the plurality of regulator are securely recorded and reconstructable;
    predicting with a RCAP (Regulatory Compliance Approval Prediction) module comprising a machine learning engine, predictive data including a probability that an application for regulatory approval by at least one regulatory agency of a value chain participant among said plurality of value chain participants will be approved by a regulator of the at least one regulatory agency among said plurality of regulators based on said first data collated and collected from said plurality of regulators and contained in said data structure including said second data indicative of actual approval-request results of applications for regulatory approval and the other data including the assigned weights and the weighted data, the predictive data including an outcome determination and a probability score indicative of a confidence of the predictive data for the at least one regulatory agency, wherein the machine learning engine further comprises a dimensional analysis and prediction engine that provides dimensional history and correlations and wherein analysis by the RCAP module is granular and the RCAP module communicates with the RCS; and
    compiling the predictive data for improvements in predictive accuracy, wherein the compiling of the predictive data comprises assigning the weights to the machine learning engine based on an accuracy of at least one predictive classification algorithm in predicting an actual outcome with respect to the actual approval-request results of applications for regulatory approval.

2. The method of claim 1 further comprising:
    predicting potential items that may be missing in said application that are potentially needed by said regulator for said regulatory approval of said application; and
    providing a summary of said potential items that may be missing in said application that are potentially needed by said regulator for said regulatory approval of said application.

3. The method of claim 1 further comprising:
    improving an accuracy of said predicting said probability that said application by said value chain participant for said regulatory approval will be approved by analyzing results of said predicting said probability over an interval of time.

4. The method of claim 1, wherein the machine learning engine comprises the at least one predictive classification algorithm.

5. The method of claim 1 wherein said machine learning engine functions as a high volume correlation engine that as said high volume correlation engine takes in new data, said high volume correlation engine constantly updates a value of each data element in said data structure in determining a predicted outcome.

6. The method of claim 5 wherein a predicted outcome of said high volume correlation engine comprises at least one of the following predicted outcomes: 1) approved by said regulator but not by another regulator among said plurality of regulators, and 2) undetermined.

7. The method of claim 5 wherein predicted outcome is based on specific regulatory criteria and published regulatory criteria and further based on decision-making criteria comprising a history of decision-making by said plurality regulators against each vendor approved or denied by the plurality of regulators.

8. A system for automatically predicting a probability of regulatory compliance approval based on data contained in a data structure, said system comprising:
    at least one processor; and
    a non-transitory computer-usable medium embodying computer program code, said non-transitory computer-usable medium configured to communicates with said at least one processor, said computer program code comprising instructions executable by said at least one processor and configured for:
        configuring said data structure comprising first data collated and collected from a plurality of regulators and a plurality of value chain participants, said data structure provided by an RCS (Regulatory Compliance System) that collates the first data and restricts disclosure in a value chain by localizing reporting to an individual value chain participant among the plurality of value chain participants and direct suppliers, said first data inclusive of second data indicative of actual approval-request results of applications for regulatory approval and other data including assigned weights and weighted data, the RCS further operable to use a distributed ledger to ensure that responses from the plurality of regulator are securely recorded and reconstructable;

predicting with a RCAP (Regulatory Compliance Approval Prediction) module comprising a machine learning engine, predictive data including a probability that an application for regulatory approval by at least one regulatory agency of a value chain participant among said plurality of value chain participants will be approved by a regulator of the at least one regulatory agency among said plurality of regulators based on said first data collated and collected from said plurality of regulators and contained in said data structure including said second data indicative of actual approval-request results of applications for regulatory approval and the other data including the assigned weights and the weighted data, the predictive data including an outcome determination and a probability score indicative of a confidence of the predictive data for the at least one regulatory agency, wherein the machine learning engine further comprises a dimensional analysis and prediction engine that provides dimensional history and correlations and wherein analysis by the RCAP module is granular and the RCAP module communicates with the RCS; and compiling the predictive data for improvements in predictive accuracy, wherein the compiling of the predictive data comprises assigning the weights to the machine learning engine based on an accuracy of at least one predictive classification algorithm in predicting an actual outcome with respect to the actual approval-request results of applications for regulatory approval.

9. The system of claim 8 wherein said instructions are further configured for:
predicting potential items that may be missing in said application that are potentially needed by said regulator for said regulatory approval of said application; and
providing a summary of said potential items that may be missing in said application that are potentially needed by said regulator for said regulatory approval of said application.

10. The system of claim 8 wherein said instructions are further configured for:
improving an accuracy of said predicting said probability that said application will be approved by analyzing results of said predicting said probability over an interval of time.

11. The system of claim 8 wherein said instructions are further configured for predicting said probability that said application by said value chain participant for regulatory approval will be approved, utilizing a classification algorithm.

12. The system of claim 8 wherein said machine learning engine comprises a high volume correlation engine that as said high volume correlation engine takes in new data, said high volume correlation engine constantly updates a value of each data element in said data structure in determining a predicted outcome.

13. The system of claim 12 wherein a predicted outcome of said high volume correlation engine comprises at least one of the following predicted outcomes: 1) approved by said regulator but not by another regulator among said plurality of regulators; and 2) undetermined.

14. The system of claim 13 wherein predicted outcome is based on specific regulatory criteria and published regulatory criteria.

\* \* \* \* \*